United States Patent [19]

Gilman et al.

[11] 4,131,028
[45] * Dec. 26, 1978

[54] MOTION CONVERSION MECHANISM

[75] Inventors: Stanley H. Gilman, White Plains; Daniel M. Marcus, New River, both of N.Y.

[73] Assignee: Gilman Manufacturing Corporation, White Plains, N.Y.

[*] Notice: The portion of the term of this patent subsequent to Nov. 9, 1993, has been disclaimed.

[21] Appl. No.: 707,760

[22] Filed: Jul. 22, 1976

Related U.S. Application Data

[63] Continuation-in-part of Ser. No. 551,613, Feb. 21, 1975, Pat. No. 3,990,317.

[51] Int. Cl.$^2$ ............................................... F16H 21/16
[52] U.S. Cl. ....................................................... 74/25
[58] Field of Search ........................... 74/25, 803, 798; 214/339

[56] References Cited

U.S. PATENT DOCUMENTS

| | | | |
|---|---|---|---|
| 3,081,639 | 3/1963 | Hauptman | 74/25 |
| 3,990,317 | 11/1976 | Gilman | 74/25 |

Primary Examiner—Benjamin W. Wyche
Assistant Examiner—Wesley S. Ratliff, Jr.
Attorney, Agent, or Firm—Hopgood, Calimafde, Kalil, Blaustein & Lieberman

[57] ABSTRACT

A mechanism for conversion between rotary and linear motion includes a rotatable roller carriage having a channel through which a shaft is passed axially. Shaft engaging drive rollers that are orbitally movable about the channel with the rotation of the roller carriage are positioned along the channel forming an acute angle therewith. Retaining rollers are held by the roller carriage parallel to the drive rollers to retain the drive rollers in a shaft engaging position. The drive rollers are driven by the retaining rollers in a rotary fashion to linearly advance the shaft.

9 Claims, 8 Drawing Figures

4,131,028

MOTION CONVERSION MECHANISM

RELATED APPLICATIONS

This is a continuation in part of U.S. patent application 551,613 to S. H. Gilman et al filed on Feb. 21, 1975, for a "Mechanism for Conversion Between Rotary and Linear Motion", now U.S. Pat. No. 3,990,317 issued on Nov. 9, 1976.

BACKGROUND OF THE INVENTION

The present invention relates to a mechanism for driving a shaft in a linear fashion in response to a rotary input, and more particularly to such a mechanism in which the shaft is driven linearly by wire engaging drive rollers that are in turn positioned by retaining rollers.

A solution to the problem of conversion between rotary and linear motion in response to a rotary input is disclosed in U.S. Pat. No. 3,081,639 issued to Murray L. Hauptman, on Mar. 19, 1963 entitled "Feed Mechanism".

In the Hauptman device, a plurality of drive rollers are positioned about a shaft, each roller forming an acute angle with the longitudinal axis of the shaft. The rollers are driven by an outer race which rotates about the shaft and produces linear movement. The Hauptman device, however, is limited by the length of axial travel of the race. Restricting axial travel produces intolerable friction. Another problem associated with the Hauptman structure is that it is not readily adapted to use with small diameter shafts such as wires where only a small number of drive rollers can be employed.

The objects of the present invention are to overcome the above mentioned limitations of the Hauptman device and, at the same time, to provide an arrangement which reduces axial movement of the wire engaging rollers to a minimum without any frictional disadvantage.

SUMMARY OF THE INVENTION

In the present invention for conversion between rotary and linear motion, a rotatable roller carriage defines a channel through which a shaft can be passed axially. A plurality of rotatable drive rollers that are orbitally movable about the channel with the rotation of the carriage are positioned along the channel to form acute angles therewith. These drive rollers are in driving engagement with a shaft (not part of the mechanism of the invention) positioned in the channel. A plurality of retaining rollers are rotatably held by the carriage parallel to the drive rollers to retain the drive rollers in a shaft engaging position. A drive means is provided for driving the drive rollers in a rotary fashion to linearly advance the shaft. The axial position of the retaining rollers and carriage is fixed with respect to the drive rollers.

When the invention is used in connection with small diameter shafts such as wires, it is sometimes advantageous to employ only two drive rollers since it is difficult to provide for engagement of the shaft by more than two such rollers simultaneously. It is therefore desirable to utilize a pair of shaft positioning guides between which the channel is defined.

The means for driving the drive rollers may comprise a drive gear carried by the retaining roller. The drive rollers are then driven through the retaining rollers.

BRIEF DESCRIPTION OF THE DRAWINGS

For a more detailed understanding of the invention, reference may be made to the description below taken in conjunction with the appended drawings wherein.

DESCRIPTION OF THE PREFERRED EMBODIMENT

Figure 1:
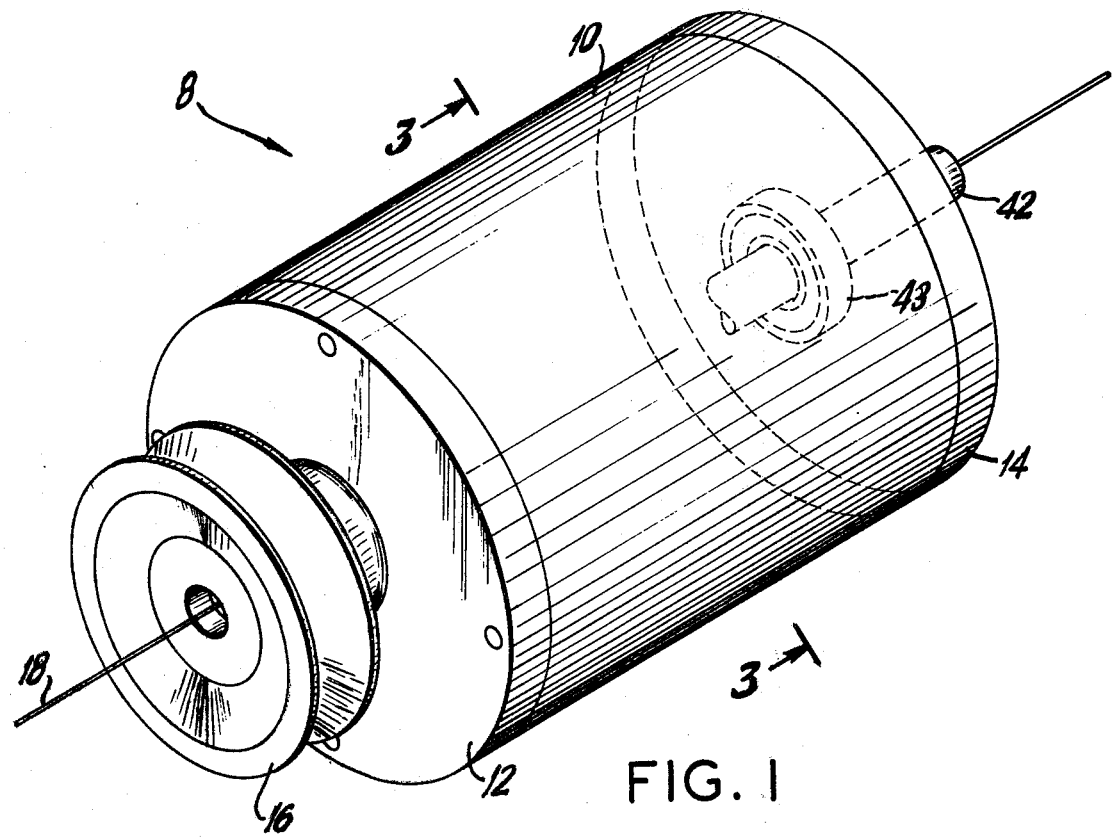
FIG. 1 is a three-dimensional pictorial view of a mechanism for converting between rotary and linear motion constructed in accordance with the invention.

FIG. 1 shows a mechanism 8 for conversion between rotary and linear motion which includes a cylindrical outer housing 10. End plates 12 and 14 are attached to opposite ends of the housing 10. A drive wheel 16 accepts energy from a belt source and imparts rotary motion to the internal mechanism. Alternatively, any source which fulfills the functional requisite described may be employed. A shaft 18 passes axially through the center of the housing 10. In this embodiment a small diameter shaft, which may be a wire, is used.

In the operation of the device, rotary power applied to the drive wheel 16 causes the shaft 18 to move linearly through the device 8. Devices operating on a similar principle are described in U.S. Pat. No. 3,081,639 to Hauptman entitled "Feed Mechanism" and allowed U.S. patent application Ser. No. 551,613 to Gilman et al, entitled "Mechanism for Conversion Between Rotary and Linear Motion", now U.S. Pat. No. 3,990,317 issued on Nov. 9, 1976. Both of these documents are incorporated by reference herein.

Figure 2:
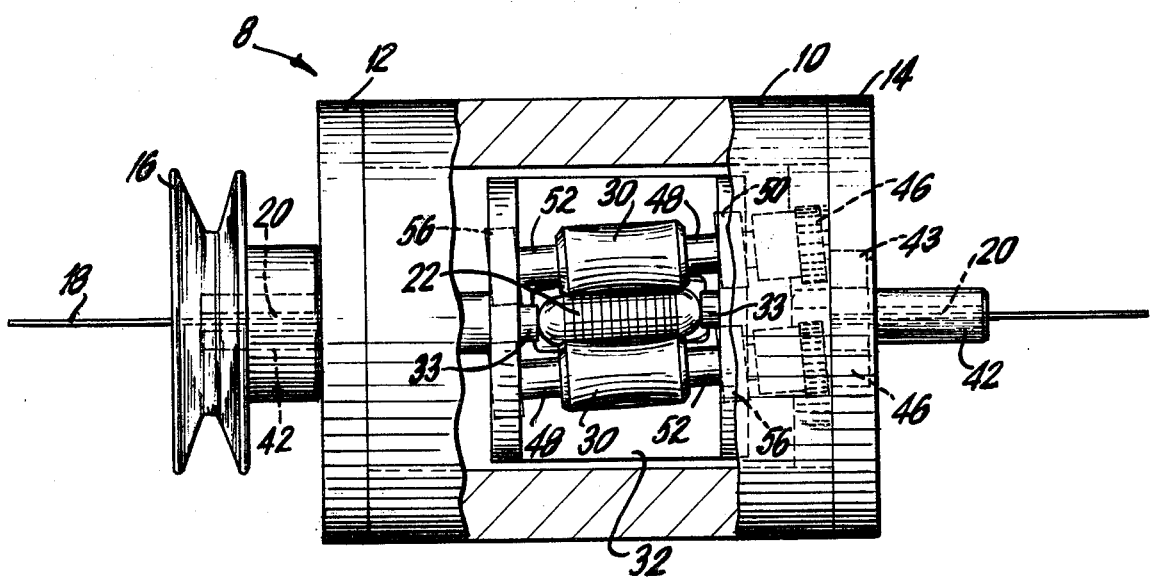
FIG. 2 is a partially broken away orthogonal view of the mechanism of FIG. 1.
Figure 3:
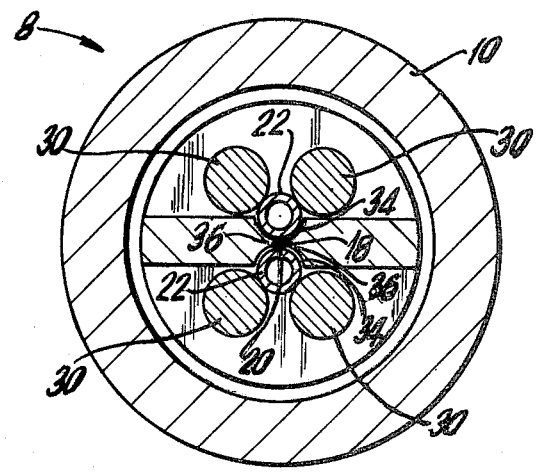
FIG. 3 is a sectional view of the mechanism of FIG. 1 taken along the line 3—3.
Figure 7:
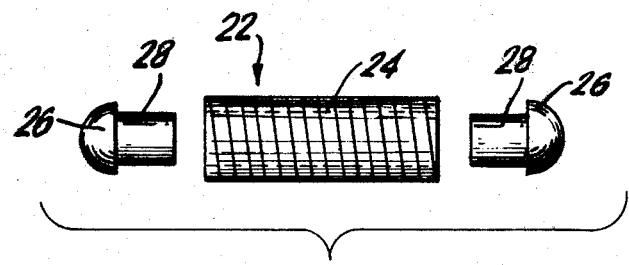
FIG. 7 shows a flexible drive roller used in the mechanism of FIG. 1.

The interior structure of the present invention may be observed in the cut away view of FIG. 2 and the sectional view of FIG. 3. The shaft 18 passes through a channel 20 which extends axially through the device. It is engaged by two flexible drive rollers 22. These rollers, shown in greater detail in FIG. 7, consist preferably of a length of steel spring 24 wound in a helix. A core piece 26 is inserted in each end of the spring 24 so that the spring loosely and rotatably engages a shaft 28 carried by each core piece 26. The exposed ends of the core pieces 26 form hemispheres.

As is most clearly visible in FIG. 2, each drive roller 22 forms an acute angle with the channel 20 and the shaft 18. It is due to this acute angle that rotation of the drive rollers 22 produces linear motion of the shaft 18. The output drive ratio of the devices varies with the angle.

The rollers 22 are held in positive engagement with the shaft 18 by a plurality of retaining rollers 30 which are parallel to the drive rollers 22 thus forming the same acute angle with the shaft 18 and the channel 20. The axial position of the retaining rollers 30 and carriage 32 with respect to the drive rollers 22 is fixed. Accordingly, the operation of the device is not limited by the need for travel of the structure that retains the drive roller 22.

Figure 5:
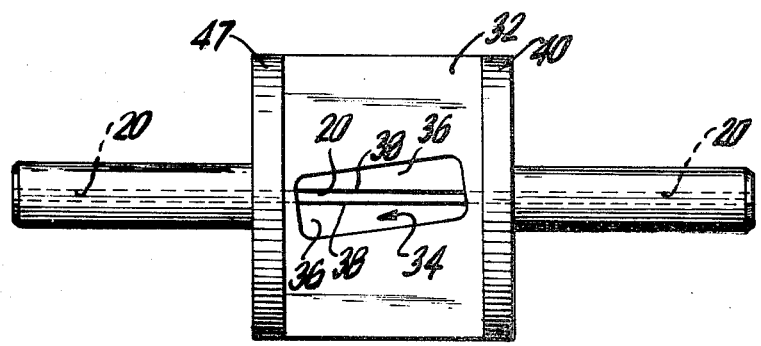
FIGS. 5 and 6 show the roller carriage of the mechanism of FIG. 1, the two views being displaced 90° with respect to each other.
Figure 6:
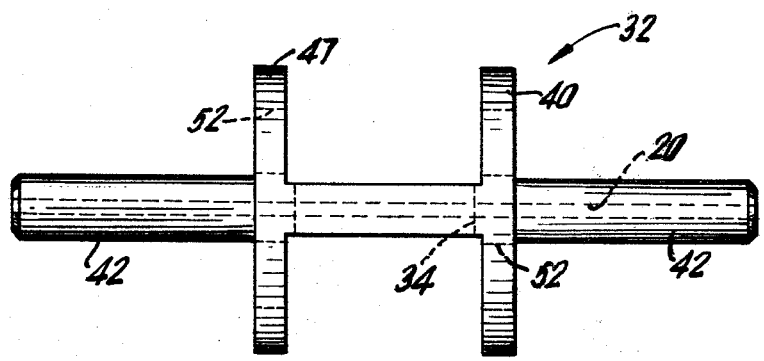

The roller carriage 32 is shown in two positions, rotated 90° with respect to each other, in FIGS. 5 and 6 respectively. In FIG. 5 it can be observed that two slots 34 that receive the rollers 22 are separated by integrally formed fin-shaped wire positioning guides 36. These guides present opposed edge surfaces 38 which define the center portion of the channel 20. As shown more clearly in FIG. 3, the guides project between the drive rollers 22 to prevent the shaft 18 from moving radially away from the line along which the drive rollers 22 come closest together.

It is possible to eliminate the slots 34 and guides 36 of the carriage 32 if three or more drive rollers 22 are used. Moreover, the number of retaining rollers can be reduced. For example, three drive rollers 22 can be held in place by three retaining rollers 30 arranged so that each retaining roller 30 engages two drive rollers 22.

Figure 4:
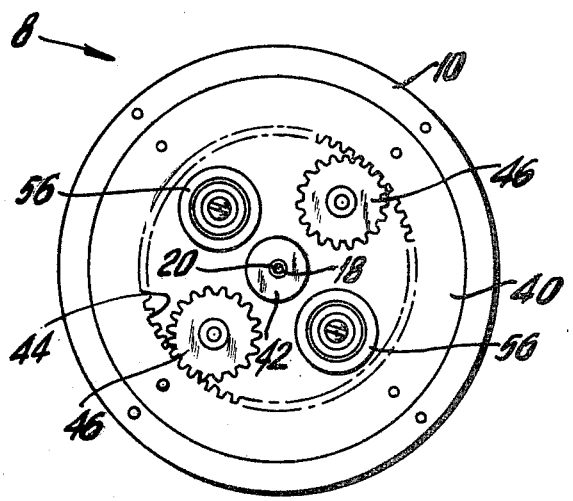
FIG. 4 is an end view of the mechanism of FIG. 1 with a cover plate removed to expose part of the drive means.

The drive mechanism of the device may be observed more clearly in FIG. 4 which shows an end view with the end plate 14 removed. A circular end 40 of the roller carriage 32 is surrounded by the cylindrical outer housing 10 and the shaft 18 projects from a protective tube-like extension 42 of the carriage 32. The extension 42 is rotatably held by a bearing 43 centrally positioned within the end plate 14.

Gear teeth 44 are formed about the inner cylindrical surface of the end of the outer housing 10 to provide a ring gear. This ring gear engages two smaller drive gears 46 rotatably mounted on the end 40 of the roller carriage 32 in a planatary arrangement. The drive gears 46 are carried by shafts 48 which project from the ends of retaining rollers 30 through bearings 50 mounted within openings provided in the ends 40 of the roller carriage 32. The drive gears 46 are keyed to the shaft 48 for rotation therewith. Thus rotation of the carriage 32 relative to the housing 10 causes orbital movement and rotation of the retaining roller 30 which in turn drive the drive rollers 22.

Particularly when larger diameter shafts are used, the drive gears 46 can be eliminated and the rotation of the carriage 32 can be relied upon to produce rotation of the orbiting 30. In this modification, however, the drive ratio is reduced.

Figure 8:
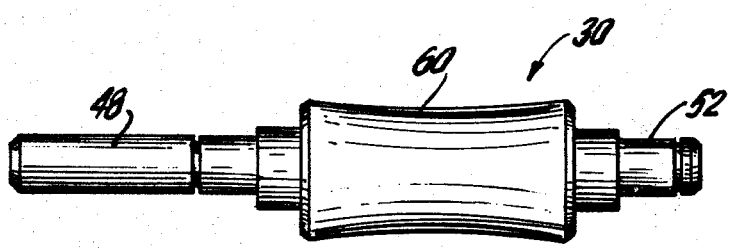
FIG. 8 shows a retaining roller used in the mechanism of FIG. 1.

A retaining roller 30 may be observed more closely in FIG. 8. The shaft 48 which carries a drive gear 46 extends axially from one end thereof. A shorter shaft 52 projects from the opposite end. In this preferred embodiment for small diameter shafts there are four retaining rollers 30. Two retaining rollers 30 are mounted on each side of the roller carriage 32 to form a pair. The retaining rollers 30 of each pair have their drive gear carrying shafts 48 extending in opposite directions and terminate within bearing 56 held by openings in the circular ends of the roller carriage 32.

At the end of the device 8 shown in FIG. 4, the two drive gears 46 are carried by retaining rollers 30 which are on opposite sides of the roller carriage 32 and engage different drive rollers 22. A similar arrangement of drive gears 46 is employed at the opposite end 47 of the roller carriage 32 in which the drive gears 46 are attached to the remaining longer shafts 48.

The flexible drive rollers 22 have a slight curvature because they are wrapped around the shaft 18 such that the longitudinal axes of the rollers 22 form an acute angle with the shaft 18. Thus the guides 36 must have a similar curvature to fit between the rollers. The retaining rollers 30 have concaved rolling surfaces 60 (FIG. 8) to engage the drive rollers 22 throughout their length. The curvature depends upon the dimensions of the shaft 18 to be engaged and the proportions of the rollers 22 and 30. It is therefore best determined empirically.

The bearings 50 and 56 provide precise axial positioning of the retaining rollers 30 which in turn precisely position the drive rollers 22 in positive engagement with the shaft 18. The space allowed for the drive rollers 22 between the retaining rollers 30 and the shaft 18 is such that the drive rollers 22 are slightly compressed for increased driving power.

It will be apparent to those skilled in the art that the embodiment described above is meant to be merely exemplary and that the specific structure of the mechanism is susceptible of variation and modification without departing from the spirit and scope of the invention. For example, a different arrangement of gears, such as a spur gear instead of the ring gear teeth 44, may be employed to drive the retaining rollers as a substitute for the planatary arrangement disclosed above. Therefore, the invention is not deemed to be limited except as defined by the appended claims.

I claim:

1. A mechanism for conversion between rotary and linear motion comprising a rotatable roller carriage defining a channel for axial passage of a shaft; a plurality of rotatable drive rollers orbitally movable with the rotation of said roller carriage, and positioned along said channel to form an acute angle therewith in driving engagement with the shaft; a plurality of retaining rollers rotatably held by said roller carriage parallel to, and in contact with, said drive rollers to retain said drive rollers in a shaft engaging position; and drive means for driving said drive rollers in a rotary fashion to linearly advance the shaft.

2. The mechanism of claim 1, wherein said drive means comprises a plurality of drive gears carried by at least some of said retaining rollers whereby said drive rollers are driven by said retaining rollers that carry said drive gears.

3. The mechanism of claim 1, wherein said drive means comprises a plurality of drive gears rotatably carried by said retaining rollers, an outer housing surrounding said carriage, and at least one additional gear attached to said outer housing for driving said drive gears.

4. The mechanism of claim 1, wherein said drive rollers are flexible and said retaining rollers have concaved external surfaces which engage said drive rollers.

5. The mechanism of claim 1, wherein each drive roller is formed by a length of metal wound in a helix.

6. The mechanism of claim 1, wherein each drive roller is formed by a length of metal wound in a helix and said retaining rollers are positioned to slighly compress said drive rollers to insure positive engagement of the shaft.

7. The mechanism of claim 1, wherein said roller carriage includes a pair of shaft positioning guides having opposing surfaces between which said channel is defined.

8. The mechanism of claim 8, wherein said roller carriage further defines a plurality of slots which receive said drive rollers.

9. The mechanism of claim 1, wherein the axial position of the carriage and retaining rollers with respect to the drive rollers is fixed.

* * * * *